United States Patent

Ayanoglu et al.

[11] Patent Number: 5,689,252
[45] Date of Patent: Nov. 18, 1997

[54] NAVIGATION SYSTEM FOR AN AUTOMOTIVE VEHICLE

[75] Inventors: Ender Ayanoglu, Red Bank; Krishan Kumar Sabnani, Westfield, both of N.J.

[73] Assignee: Lucent Technologies Inc., Murray Hill, N.J.

[21] Appl. No.: 612,203

[22] Filed: Mar. 7, 1996

Related U.S. Application Data

[63] Continuation of Ser. No. 334,658, Nov. 4, 1994.

[51] Int. Cl.[6] .................................................. G08G 1/123
[52] U.S. Cl. ...................... 340/991; 340/905; 340/995; 340/990; 340/993; 342/357; 344/421; 344/444.2; 344/449.7; 344/436; 344/437
[58] Field of Search ....................... 340/990, 988, 340/995, 905, 991, 993; 344/421, 444, 449, 436, 437; 342/357

[56] References Cited

U.S. PATENT DOCUMENTS

| | | | |
|---|---|---|---|
| 4,951,212 | 8/1990 | Kurihara et al. | 369/449 |
| 5,119,102 | 6/1992 | Barnard | 342/357 |
| 5,144,318 | 9/1992 | Kishi | 364/421 |
| 5,172,321 | 12/1992 | Ghaem et al. | 364/444 |
| 5,179,519 | 1/1993 | Adachi et al. | 340/995 |
| 5,182,555 | 1/1993 | Sumner | 340/995 |
| 5,210,540 | 5/1993 | Masumoto | 364/449 |
| 5,220,509 | 6/1993 | Takemura et al. | 340/988 |
| 5,225,842 | 7/1993 | Brown et al. | 342/357 |
| 5,257,023 | 10/1993 | Furuya | 340/995 |
| 5,272,638 | 12/1993 | Martin et al. | 340/995 |
| 5,274,560 | 12/1993 | LaRue | 340/988 |
| 5,289,184 | 2/1994 | Suzuki | 340/905 |
| 5,293,163 | 3/1994 | Kakihara et al. | 340/995 |
| 5,307,277 | 4/1994 | Hirano | 340/988 |
| 5,307,278 | 4/1994 | Hermans et al. | 340/991 |
| 5,311,434 | 5/1994 | Tamai | 340/990 |
| 5,313,200 | 5/1994 | Sone | 340/905 |
| 5,539,429 | 7/1996 | Yano et al. | 345/173 |
| 5,539,645 | 7/1996 | Mandhyan et al. | 364/438 |
| 5,543,789 | 8/1996 | Behr et al. | 340/995 |

*Primary Examiner*—Jeffery Hofsass
*Assistant Examiner*—Benjamin C. Lee

[57] ABSTRACT

A navigation system for an automotive vehicle designed to display a road map image around the vehicle in correlation with the current position of the automotive vehicle. The navigation system is adapted to determine a best navigation route to a selected destination on the basis on the approximated time necessary to travel such a navigation route in correspondence to its travel length and speed rate.

22 Claims, 3 Drawing Sheets

NAVIGATION SYSTEM FOR AN AUTOMOTIVE VEHICLE

This application is a continuation of application Ser. No. 08/334,658, filed on Nov. 4, 1994.

BACKGROUND OF THE INVENTION

1. Field of the Invention

The present invention relates to a navigation system for an automotive vehicle and, more particularly, to an improvement for determining a navigation route from the current position of an automotive vehicle to a given destination.

2. Background of the Invention

Electronic navigation and information systems have been developed for implementation in automotive vehicles. These systems alleviate the driver or the passengers of an automotive vehicle from the task of finding the best route to a destination. Such systems are particularly useful in regions unfamiliar to the driver in that it avoids the tedious tasks of map interpretation.

The prior-art systems have further been adapted to display the current position and traveling direction of the automotive vehicle in correlation with a map image overlapped on a display screen of a CRT (cathode ray tube) display unit located adjacent the driver's seat of the vehicle so as to further assist the driver in navigation tasks.

In order for such a system to provide the aforementioned navigation services, the system must be oriented to the actual position of the automotive vehicle relative to a road map. The actual position of an automotive vehicle may be determined in correlation with the global positioning system (GPS), the LORAN navigation system, an inertia navigation system (e.g., the dead-reckoning system) or a radar-like service such as ranging. For example, the global positioning system (GPS) determines the position of an automotive vehicle in a global geometrical region through the method of triangularization. Typically, a global positioning system includes a receiver for receiving radio waves transmitted from three or more GPS satellites. The global positioning system determines the position of a reception point where the receivers have received the radio waves, based on quasi-distance data between the GPS satellites and the reception point, including a time offset of the receiver, and positional data of the GPS satellites.

Once the actual position of the automotive vehicle is determined and the desired destination has been inputted by the user, the system is then enabled to provide the vehicle operator with information regarding the best route to be followed from the current vehicle location to a desired destination. In the prior art, the best route is determined through the process of discovering the minimum distance between the desired destination and the actual position of the automotive vehicle. However, such a process is prone to setbacks. One such setback is that the prior art system does not take into account route speed rates. For example, two competing routes (A and B) connect the automotive vehicle to a desired destination. Route A has a travel length of 30 miles and a corresponding speed rate of 25 mph, and route B has a travel length of 35 miles and a corresponding speed rate of 45 mph. The prior art system would select route A in view of its shorter travel length (30 miles) eventhough route B (35 miles) would provide the quickest route (in time) to the desired destination. Therefore, the prior art is in that it determines the best route to only be a function of its travel length and not rate of speed.

SUMMARY OF THE INVENTION

The present invention relates to a navigation system for an automotive vehicle, and in particular to a navigation system adapted to determine the best route to a selected destination on the basis of the time necessary to travel such a route. The system includes positioning means for determining the actual position of the automotive vehicle relative to a displayed road map. Preferably, the positioning means includes the global positioning system (GPS) which determines the position of the automotive vehicle by measuring the propagation delay times of signal waves propagated from GPS satellites circling around the earth in predetermined orbits.

The system further includes map means for storing a plurality of road maps, wherein the map means may include a CD-ROM device mounted in the automotive vehicle or a central database which transmits road map information to the automotive vehicle. In conjunction with the map means, the system includes selecting means for selecting a road map from those stored in the map means on the basis of the current position of the automotive vehicle. Display means are provided for displaying the current position of the automotive vehicle on a selected map. Input means are further provided for enabling a user to select a desired destination stored in the map means.

The best route to a selected destination is determined by means which is adapted to select a navigation route of a shortest duration from the current location of the automotive vehicle to the selected destination. The method for determining the aforementioned best route includes the steps of identifying the available navigation routes from the current position of the automotive vehicle to the desired destination. After which, the travel length and rate of speed of each identified navigation route is determined. The time necessary to travel each identified navigation route is then calculated in dependence upon its determined travel length and rate of speed. The best route is therefore the identified navigation route which requires the shortest travel time.

BRIEF DESCRIPTION OF THE DRAWINGS

The foregoing features of the present invention will become more readily apparent and may be understood by referring to the following detailed description of illustrative embodiments in accordance with the subject invention with reference to the drawings wherein.

DETAILED DESCRIPTION OF THE PREFERRED EMBODIMENTS

Figure 1:
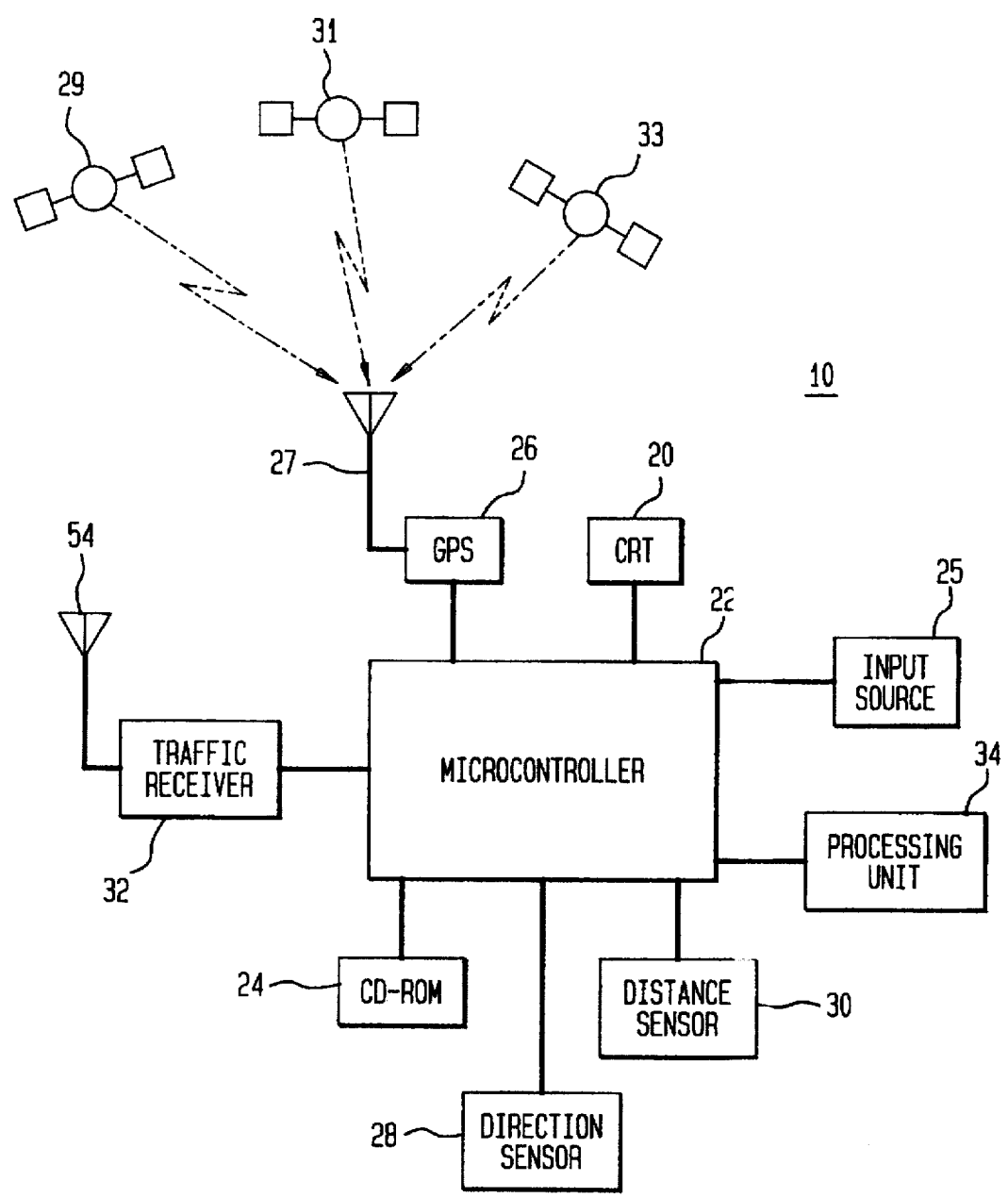
FIG. 1 illustrates a block diagram of a preferred embodiment of a navigation system according to the present invention.

Referring now to the drawings, in which like reference numerals identify similar or identical elements. FIG. 1 illustrates a block diagram of a navigation system adapted to implement the present invention, designated generally by reference numeral 10. Such a system 10 preferably includes a global positioning system (GPS) 26 for approximating the actual position of an automotive vehicle 70 (FIG. 2), as is conventional. The GPS 26 is illustrative only and is a preferred embodiment adapted for the implementation of the present invention. The system 10 is not to be limited to the aforementioned GPS 26 for approximating the current position of the automotive vehicle, but may rather incorporate other known positioning means such as: LORAN; Dead-Reckoning; or radar services.

Figure 2:
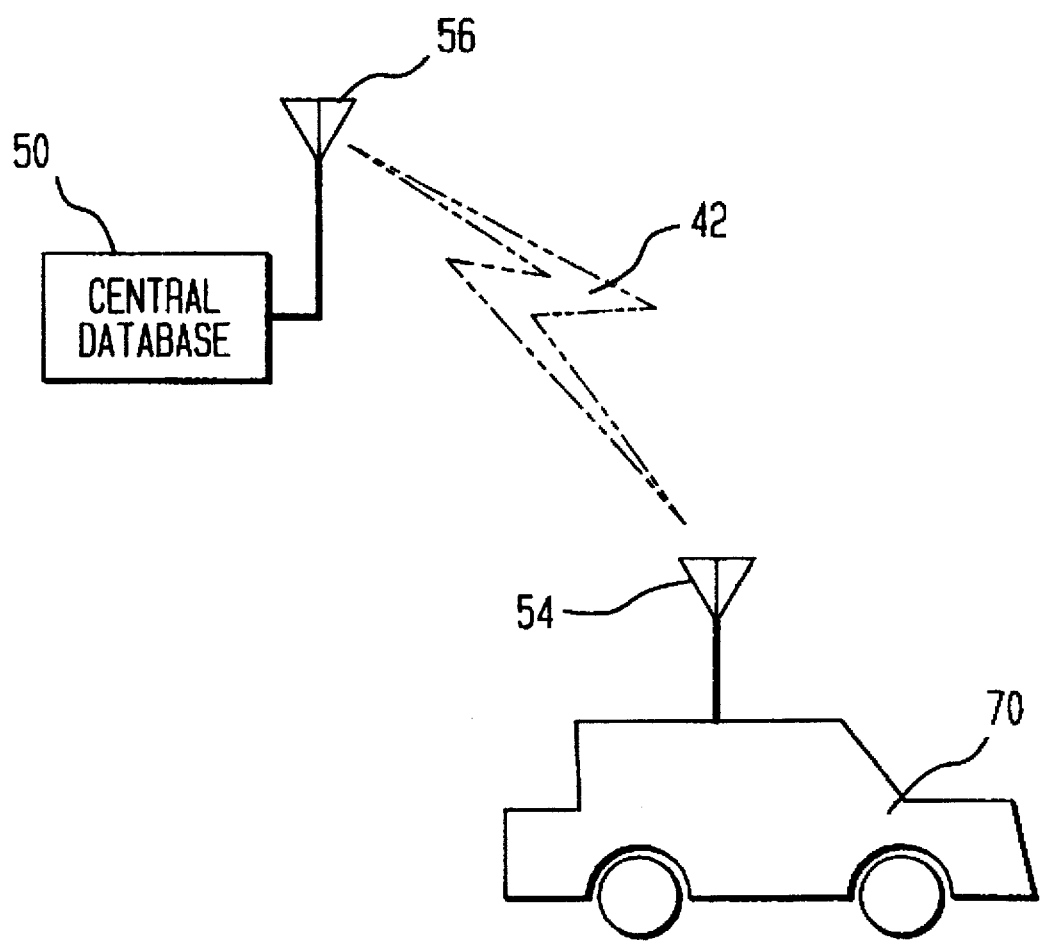
FIG. 2 illustrates a central database in communication with the navigation system of FIG. 1.

The configuration of the navigation system 10 shown in FIG. 1 includes a microcontroller 22, and a cathode ray tube (CRT) 20 coupled to the microcontroller 22 adapted to display images for navigation of an automotive vehicle 50 (FIG. 2). An input source 25, preferably in the configuration of a keyboard (not shown), is coupled to microcontroller 22 to enable driver input into the system 10 (e.g., to enable a driver to designate a destination while viewing the CRT 20 or input a desired traveling route). The input source 25 may alternatively be a touch panel (not shown) implemented on the screen of the CRT 20 wherein the touch panel utilizes light-emitting diodes and light-receiving elements. The system 10 further preferably includes a conventional CD-ROM (compact disc read only memory) 24 coupled to the microcontroller 22. As is conventional, the CD-ROM 24 is adapted to store various road map information classified in accordance with selected geographical regions.

The aforementioned global positioning system receiver (GPS) 26 is coupled to the microcontroller 22 and is adapted to receive positioning signals, via antenna 27, from GPS satellites 29, 31 and 33 so as to enable the approximation of the actual position of the automotive vehicle. Preferably, the microcontroller 22 is coupled to both a direction sensor 28 for detecting the direction of travel of the automotive vehicle, and a distance sensor 30 for measuring the traveling distance of the automotive vehicle to assist the GPS 26 in the approximation of the actual position of the automotive vehicle.

In accordance with the present invention and with continued reference to FIG. 1, the system 10 includes the provision of a traffic information receiver 32 coupled to the microcontroller 22. The traffic information receiver 32 is adapted to input traffic information into the microcontroller 22 to be processed therein and displayed on the CRT 20. For example, such traffic information may include traffic congestion, traffic speed, road conditions, road closures, detours, etc.

Referring now to FIG. 2, the traffic information receiver 32 receives such traffic information preferably from a central database 50, via a wireless radio link 42 and respective antennas 54 (FIG. 1) and 56. The transmitted traffic information is in preferably a minimum data representation format so as to minimize transmission time. For example, a locally stored map typically has speed limits, while the transmitted data consists of variable length differences from the typical value where no information is transmitted in furtherance of inconsiderable differences from the aforementioned typical value. To further minimize transmission time, high degree quantization of speed limit differences is employed. For example, for 12 mph reduction on the average on a certain road, the transmitted information can be reduced to 10 mph. Still further to minimize transmission time, typical patterns with season or during a day are captured and placed into databases so that the updated transfer of information is minimized. Preferably, the traffic information, such as traffic speed corresponding to a route of travel, is periodically updated and inputted into the central database 50 either via human observation or from actual electronic road measurement devices.

In another preferred embodiment of the present invention, traffic information is periodically updated to the central data base 50 whereby mobile users periodically transmit their respective position and speed to the central database 50. The central database 50 is configured to then average the aforementioned received information provided by the mobile users so as to determine the average speed rate on various traffic routes. Preferably, each mobile user is enabled to initiate the minimum path information, and by notifying the central database 50 of its position and its destination, the mobile user can obtain the best route information from the central database 50. Still further, the transmitted wireless message from each mobile user may include any known type of information such as differential correction information from the GPS receiver 26.

Further, the central database 50 may be adapted to store and transmit the aforementioned various road map information to the microcontroller 22 implemented in the automotive vehicle 70 so as to obviate the need for the CD-ROM 24. Therefore, the various road map information to be displayed on the CRT 20, in another preferred embodiment of the present invention, is transmitted from the central database 50 to the microcontroller 22 in the automotive vehicle 70. Further, it is to be appreciated that the updated traffic information provided to the traffic information receiver 32 may be provided to the user on request via a wireless channel (i.e., a premium service). Still further, trouble traffic stops may be preferably immediately broadcasted on a broadcast channel which is being monitored by the user.

The microcontroller 22 is coupled to a processing unit 34 which is adapted to read a road map related to a geographical region in which the automotive vehicle is currently traveling from the CD-ROM 24 on the basis of the current position of the automotive vehicle as detected by the GPS 26. Preferably, in the preferred embodiment of the present invention, each stored road map is converted into a data structure wherein a street map includes at least two fields including the speed and length of each route stored thereon. The microcontroller 22 is adapted to then display the actual position of the automotive vehicle overlapped with an appropriate road map on the display screen of the CRT 20. The processing unit 34 is further adapted to calculate the best route to a selected destination on the basis of the travel length and traffic speed of individual routes, as discussed in detail below.

As mentioned above, in the prior art, the best route was calculated on the basis of the shortest navigation route between the current position of the automotive vehicle and the desired destination. However, such a best route calculation was prone to setbacks. One such setback was that the respective speed limits of competing routes was not considered in the best route calculation.

Figure 3:
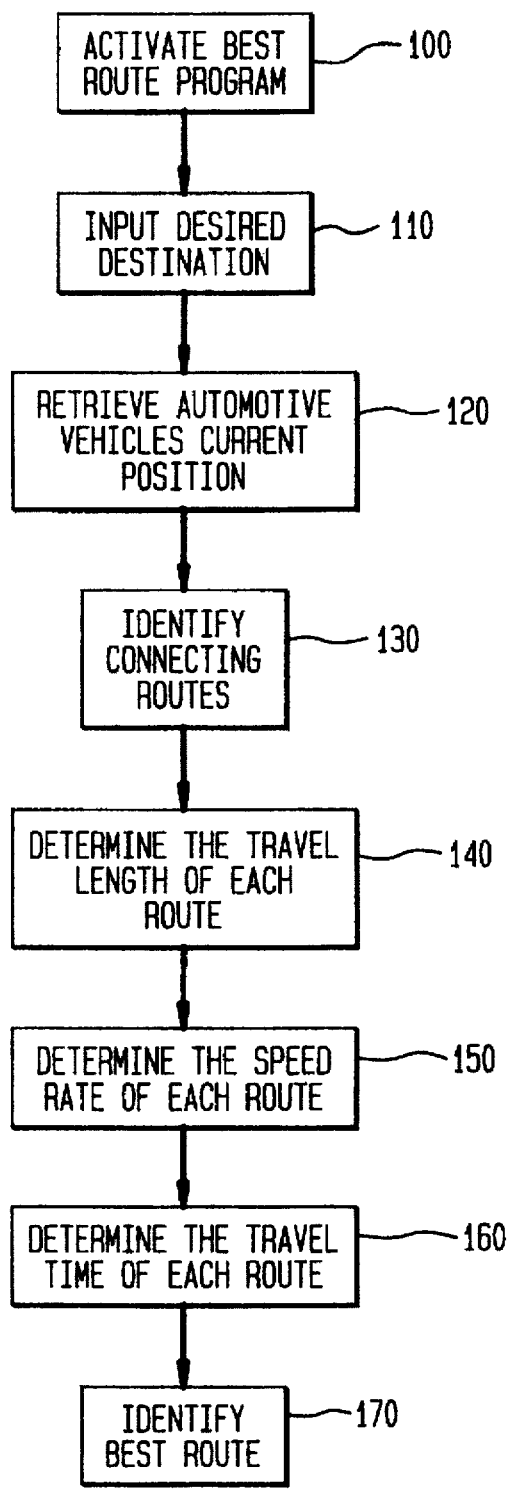
FIG. 3 illustrates a flow chart depicting the method of selecting a best route in accordance with the present invention.

The method of determining a best route is illustrated in the schematic of FIG. 3. It is noted that the best route may either be determined in the aforementioned processing unit 34 or the central database 50. For example, if the system 10 does not utilize a CD-ROM 24, then the central database 50 may be configured to both store various road maps of geographical regions as well as calculate the best route to a given destination. Further, in another preferred embodiment, the system 10 may utilize a CD-ROM 24 or equivalent structure (i.e. a magnetic tape drive) to store various road maps, wherein the processing unit 34 retrieves the map information from the CD-ROM 24, the automotive vehicle's current position from the GPS receiver 26 and traffic information from the central database 50 to calculate the best route to a given destination. One skilled in the art may configure the aforementioned system 10 in numerous configurations to calculate a best route as illustrated and described hereinbelow.

Referring to FIG. 3, the user (e.g., the operator of the automotive vehicle) first activates the best route program, block 100, by inputting appropriate information into the input source 24 (FIG. 1). The user then inputs, via the input source 25, a particular desired destination, block 110. The microcontroller 22 then retrieves the current position of the automotive vehicle from the GPS receiver 26, block 120. The system 10 next identifies the navigation routes available for travel between the current position of the automotive vehicle and the aforementioned desired destination, block 130. The system 10 then determines the length (e.g., miles, kilometers, etc.) of each aforementioned identified route, block 140. The rate of speed, via the central database 50, of each aforementioned identified route is then determined, block 150.

Once the travel length, block 140, and rate of speed, block 150, of each identified route has been determined, the system 10 then determines the required time to travel each identified route, block 160, by correlating its travel length, block 140, with its rate of speed, block 150. For example, the system 10 determines that there are two competing routes (e.g., A and B) interconnecting the current position of the automotive vehicle, block 120, to the selected desired destination, block 110. Route A has a travel length of 80 miles, block 140, and a corresponding rate of speed of 40 miles per hour (MPH), block 150, while route B has a travel length of 90 miles, block 140, and a corresponding rate of speed of 60 MPH, block 150. Therefore, route A requires a travel time of 2 hours, (travel time=travel length/rate of speed), while route B requires a travel time of 1½ hours. Thus, the system 10 is adapted to identify route B to be the best route, block 170, in view of its shorter travel time (e.g., 1½ hours) in comparison to route A (e.g., 2 hours). The best route is thus more accurately determined based upon travel time in dependence upon its travel length and rate of speed.

While the invention has been particularly shown and described with reference to preferred embodiments, it will be understood by those skilled in the art that various modifications in form and detail may be made therein without departing from the scope and spirit of the invention. It is to be appreciated for instance, that the system 10 of the present invention may calculate the best route in either the aforementioned microcontroller 22 or central database 50. It is further contemplated that the system 10 of the present invention may be integrated for use in a driverless vehicle navigation system. Accordingly, modifications such as those suggested above, but not limited thereto, are to be considered within the scope of the invention.

What is claimed is:

1. A vehicle navigation system for identifying a desired map route between a first position of a vehicle and a second position, which comprises:

(a) map means for storing a plurality of road maps and speed limit values for roads therein;

(b) input means for enabling a user to select said first and second positions;

(c) selecting means for selecting a road map from those stored in said map means on the basis of said selected first and second positions of said vehicle;

(d) traffic receiving means for receiving traffic information including speed rates transmitted in a data representation format of variable length differences from said stored speed limit values for respective roads contained on said selected road map over a wireless channel from a centrally located database to said vehicle; and (e) means for determining a route of shortest duration between said first position and said second position from said selected road map on the basis of said speed rates received by said traffic receiving means and the length of travel between said first and second positions of said vehicle.

2. A vehicle navigation system as recited in claim 1, wherein said map means includes a CD-ROM device for storing and retrieving said plurality of road maps.

3. A vehicle navigation system as recited in claim 1, wherein said input means includes positioning means for determining an actual first position of said vehicle.

4. A vehicle navigation system as recited in claim 3, further including display means for displaying the actual position of said vehicle on a said selected road map.

5. A vehicle navigation system as recited in claim 4, wherein said map means includes said centrally located database adapted to store and retrieve said plurality of road maps and transmit a selected road map to said vehicle.

6. A vehicle navigation system as recited in claim 5, wherein said means for determining a route of shortest duration is adapted to determine the time necessary to travel said each identified navigation route by its corresponding speed rate provided by said traffic receiving means.

7. A vehicle navigation system as recited in claim 5, wherein said traffic receiving means is adapted to display traffic information on said display means in association with the actual position of said automotive vehicle.

8. A vehicle navigation system as recited in claim 1, wherein said centrally located database includes typical seasonal and daily traffic patterns.

9. A vehicle navigation system as recited in claim 1, wherein each street of said road map includes speed rate and length of said street.

10. A vehicle navigation system as recited in claim 1, wherein no speed rate information concerning a particular road in a route is transmitted to said vehicle when inconsiderable differences exist between the associated speed limit and the speed rate on the road, thereby reducing transmission time of traffic information.

11. A vehicle navigation system, comprising positioning means for determining the actual position of said automotive vehicle, display means for displaying the position of said automotive vehicle, map storage means for storing a map to be displayed on said display means and for storing speed limit values for roads in said map, wherein the improvement comprises means for determining a best route to a given destination, said best route means adapted to identify and display on said display means the best route connecting the actual position of said automotive vehicle received from said positioning means with a given destination stored in said map storage means, said best route means including calculating means for identifying said best route on the basis of the time required to travel said best route and a traffic receiving means for receiving traffic information including speed rates transmitted in a data representation format of variable length differences from said stored speed limit values for respective roads contained in said map means over a wireless channel from a centrally located database to said vehicle.

12. The vehicle navigation system according to claim 11, further comprising:

means in said vehicle for periodically transmitting said actual position and speed rate of said vehicle to said central database;

means in said central database for averaging speed rate information received from a plurality of said vehicles; and means in said actual database for transmitting updated traffic information to said vehicle, upon request via a wireless channel, said updated traffic information being based on the averaging of said speed rate information.

13. A vehicle navigation system as recited in claim 11, wherein no speed rate information concerning a particular road in a route is transmitted to said vehicle when inconsiderable differences exist between the associated speed limit and the speed rate on the road, thereby reducing transmission time of traffic information.

14. A navigation system as recited in claim 11, wherein said calculating means is adapted to determine the time necessary to travel each of a plurality of identified navigation routes by dividing the length of travel of each said identified navigation route by its corresponding speed rate provided by said traffic receiving means.

15. A navigation system as recited in claim 14, wherein said traffic receiving means is adapted to display traffic information on said display means in association with the actual position of said automotive vehicle provided by said positioning means.

16. The vehicle navigation system according to claim 11, further comprising:
   means for transmitting information from said vehicle to said central database including said actual position of said vehicle and said desired destination;
   means in said central database for determining a best route for said vehicle; and
   means for transmitting said best route to said vehicle.

17. The vehicle navigation system according to claim 16, further comprising:
   means in said vehicle for periodically transmitting said actual position and speed rate of said vehicle to said central database;
   means in said central database for averaging speed rate information received from a plurality of said vehicles; and
   means in said actual database for transmitting updated traffic information to said vehicle, upon request via a wireless channel, said updated traffic information being based on the averaging of said speed rate information.

18. A method of determining a best navigation route for an automotive vehicle, comprising the steps of:
   determining an actual position of the automotive vehicle;
   selecting a desired destination of the vehicle;
   transmitting information indicative of said actual position of the vehicle and said desired destination from said vehicle to a central database;
   selecting, at said central database, a best navigation route for said vehicle based on said information transmitted by said vehicle and on speed rates of traffic in routes between said actual position and said desired destination of said vehicle, stored within said central database;
   transmitting said best navigation route as map information from said central database to said vehicle;
   periodically transmitting actual positions and speed rates of each of a plurality of said vehicles that also transmit said desired destination to said central database;

averaging, at said central database, speed rate information received from said plurality of vehicles;
   transmitting updated traffic information to said vehicles, said updated information being based on said averaging of speed rate information.

19. A method of determining a best navigation route from an actual position of an automotive vehicle to a selected desired destination which comprises the steps of:
   (a) determining the actual position of said automotive vehicle;
   (b) storing a plurality of road maps and speed limit values for roads on said maps;
   (c) selecting a desired destination from one of said stored road maps;
   (d) identifying the navigation routes from the actual position of said automotive vehicle to said selected desired destination;
   (e) receiving traffic information on the basis of the actual position of said automotive vehicle including speed rates of said identified navigation routes transmitted in a data representation format of variable length differences from said stored speed limit values for respective roads over a wireless channel from a centrally located database to said automotive vehicle;
   (f) determining travel time necessary to travel each of said identified navigation routes based on the traffic information received; and
   (g) selecting one of said identified navigation routes having the shortest travel time.

20. A method of determining a best navigation route as recited in claim 19, wherein said step (f) of identifying said best navigation route includes the steps of:
   (i) determining the travel length of said each identified navigation route;
   (ii) determining the rate of speed of said each identified navigation route; and
   (iii) determining said travel time of each said identified navigation route by dividing said travel length by said rate of speed associated with said each identified navigation route.

21. A method of determining a best navigation route as recited in claim 19, further including the steps of:
   (h) providing display means for displaying the actual position of said automotive vehicle on a road map provided from said means for storing a plurality of road maps; and
   (i) displaying said best navigation route on said display means.

22. A method of determining a best navigation route as recited in claim 21, further including the steps of
   (j) displaying said traffic information on said display means.

* * * * *